United States Patent

Pailles et al.

[11] Patent Number: 6,105,862
[45] Date of Patent: Aug. 22, 2000

[54] METHOD FOR PERFORMING A DOUBLE-SIGNATURE SECURE ELECTRONIC TRANSACTION

[75] Inventors: Jean-Claude Pailles, Epron; Marc Girault; Patrick Remery, both of Caen, all of France

[73] Assignees: France Telecom, Paris; La Poste, Boulogne Billancourt, both of France

[21] Appl. No.: 09/147,213

[22] PCT Filed: May 7, 1997

[86] PCT No.: PCT/FR97/00826

§ 371 Date: Oct. 29, 1998

§ 102(e) Date: Oct. 29, 1998

[87] PCT Pub. No.: WO97/42610

PCT Pub. Date: Nov. 13, 1997

[30] Foreign Application Priority Data

May 7, 1996 [FR] France .................................. 96 05706

[51] Int. Cl.⁷ .................................................... G06F 17/00
[52] U.S. Cl. .............................. 235/375; 380/24; 380/25; 705/39
[58] Field of Search ................................ 235/379; 902/2, 902/4, 8; 705/35, 39, 43; 380/24, 25

[56] References Cited

U.S. PATENT DOCUMENTS

| | | | |
|---|---|---|---|
| 5,224,162 | 6/1993 | Okamoto et al. | 380/24 |
| 5,511,121 | 4/1996 | Yacobi | 380/24 |
| 5,805,702 | 9/1998 | Curry et al. | 380/24 |
| 5,832,089 | 11/1998 | Kravitz et al. | 380/24 |

*Primary Examiner*—Karl D. Frech
*Assistant Examiner*—Jamara A Franklin
*Attorney, Agent, or Firm*—Oblon, Spivak, McClelland, Maier & Neustadt, P.C.

[57] ABSTRACT

A method for performing electronic transactions between a card, a service provider having at least one terminal configured to accept the card and a centralized system configured to be connected to the terminal. The terminal transmits to the card a parameter M including the sum of the transaction and its identity. The card produces two signatures, a first signature (z) depending on a secret debit key (k) and on the parameter (M), this first signature being a proof that the card balance has been debited; and a second signature (y) depending on the first signature (z), the second signature being produced either by an RSA algorithm or by an interactive algorithm. The terminal checks the second signature (y) but not the first one because it is unable to recover the secret debit key (k). The terminal stores the different first signatures (proofs) (z) and the parameters (M) for the different transactions. The centralized system can collect the first signatures and the parameters. The centralized system can recover the secret debit key (k) based on the card identities and can credit the service provider.

5 Claims, 4 Drawing Sheets

METHOD FOR PERFORMING A DOUBLE-SIGNATURE SECURE ELECTRONIC TRANSACTION

FIELD OF THE INVENTION

The present invention relates to a procedure for performing a dual-signature electronic transaction.

The invention can be applied to all sectors in which terminals are required to perform secure transactions with users holding chip cards, said terminals not being permanently connected to centralized processing systems, but only periodically, during collection of transactions performed since the last collection.

BACKGROUND ART

In order to clarify the following explanation, the situation of transactions of the type known as "electronic wallet" will be used. This technology was the subject of a special issue (No. 158) of the magazine "L'Echo des Recherches" published in the 4th quarter of 1994. Of particular interest is an article by Marc Girault and Luc Vallee entitled "Signature electronique et application au paiement electronique" (Electronic Signatures and their Application to Electronic Payment).

Although electronic wallet technology has developed considerably over recent years, the security of this type of application still poses problems into which research is continuing. Various solutions to these problems are possible and may be examined on a security/cost basis.

In this type of system an electronic wallet (EW) card carries a balance, i.e. a certain quantity of values (currency, tokens, consumption units, etc.). On payment of a sum m, this balance is reduced by m units, the card producing proof that m units have been debited; this constitutes the guarantee of payment for a trader equipped with a terminal or server on which the user performs the transaction. This proof is the condition on which the trader receives payment in normal currency from the authority who issued the electronic wallet; this authority may be referred to as the "bank".

The proof must be verified to avoid the use of forged cards: it should not be possible to construct out of nothing i.e. without a card, proof capable of being accepted as authentic. The proof should also prevent manipulations such as converting a sum m into a sum m' that is greater than m, or reusing the same proof to pay the sum due to a trader twice or, again, paying sums not due to other traders.

In the following description the various participants in these systems will be described as the "user", "service provider" and "bank". The user has an EW card to pay a service provide while the bank is the body issuing the cards.

The techniques in current use may be broken down into three broad categories according to whether the signatures they use have a secret key, a public key or interactive keys.

In the first type, a terminal may be disconnected from the bank (said to be offline) or connected directly to the bank. The first configuration (offline) is the commonest in the various existing electronic wallet systems. It consists in calculating the proof z using a secret key algorithm f applied to parameter i representing the number of the EW card, and to parameter M which stands for all the following parameters:

m: the sum of the transaction, j: the number of the security module, usually known as the Secure Application Module or SAM, r: a random value or, more simply, the reading on a counter.

This gives $z=f(k,m,j,r)$ where k is the secret key of the EW card whose identity is i. This key is dependent on i due to a mechanism of diversifying the keys according to the number i of the card. The SAM is a chip card located in the terminal whose physical properties enable it to act as a secure, protected cash register. The SAM therefore checks the certificate z and accumulates the sums received. It is regularly emptied so that the service provider's profits are credited by the bank; this is done using a secure procedure between the SAM and the bank. There are no particular difficulties involved in this procedure, so it will not be described here.

In order to check certificate z the SAM needs to know the keys of all EW cards. In practice this is done by calculating the keys k of the EW cards using the diversification formula $k=g(KM,i)$, where KM is a master key that is valid for the entire system and present in all SAMs.

This method is shown in FIG. 1 attached where the user's EW card is numbered 10, the service provider's terminal is numbered 20 and its SAM 25, and the bank is numbered 30. The arrow running from terminal 20 towards card 10 represents the transmission of parameters n to the card and the arrow running in the opposite direction represents the transmission of the certificate z to the terminal.

This first method has the advantage of using low-cost cards. However, it has the following drawbacks:

security is based on the impossibility of reading the master key KM in the SAM and thus on the physical security of the SAMs; since the SAMs are installed in every terminal they are very widespread. This security is therefore difficult to preserve. Possession of the master key KM would make large-scale fraud possible: cards could be produced having any identity i that no blacklist system would be capable of intercepting;

the SAMs are located in the terminals or on the service provider's premises. This creates practical problems when several types of EW card, each having its own SAM, are to be accepted. This is the case which, incidentally, is very widespread in practice, where more than one bank issues its own EW cards.

Turning now to configurations in which the service provider terminal is connected to the bank (i.e. online), the SAMs are no longer inside the terminals and the certificate must be checked at the bank. This procedure is illustrated in FIG. 2 attached in which the numbering is the same as in FIG. 1.

In practice this system is of little interest since the telecommunications costs are prohibitive. Electronic wallet systems must be cost-effective even for transactions involving very small sums.

Systems that incorporate a signature procedure using a public key algorithm may be divided into two types depending on whether or not they use a Secure Application Module (SAM).

If no SAM is to be used, the certificate z of the foregoing secret-key systems is replaced by a signature based on a public key algorithm such as the RSA (Rivest-Shamir-Adleman) algorithm. Each card has a pair of secret and public keys, s and p respectively, and the proof of debit defined by parameter M is obtained by calculating a signature $y=s(M)$.

The service provider can check this signature using the public key. All the signatures can be stored for periodic collection to record payments by the bank. In this type of configuration the public key p must also be authenticated by the card-issuing authority since the mere holding of a pair of secret and public keys, s and p does not prove that the EW card is genuine; this type of pair can easily be detected, for example using a personal computer on which appropriate software has been installed. The EW card must therefore provide the terminal not only with its public key p but also a certificate linked to public key p. This certificate will be referred to as "cer" below. The certificate "cer" is checked with the bank's public key PA.

FIG. 3 attached illustrates this configuration. Although the numbering is the same as for FIGS. 1 and 2, it will be noted that the service provider's terminal 20 is provided with means 26 of collecting or recording card numbers i, parameters M, certificates cer and signatures y.

The advantage of this system is that no SAM or secret master key is present in the terminals with the risks that this involves. This system is therefore more secure and has greater flexibility.

However, the system has the following drawbacks:

the cost of cards capable of performing calculations based on RSA-type public-key algorithms is high since the computing power required for a given response time is significant;

a large amount of data must be stored in and collected from the terminal; M and y must be stored for each transaction. Given the current length of public keys (512 bits), this set of data amounts to something of the order of 1.5 kbits.

In the version with a Secure Application Module, transactions are accumulated in the terminal for subsequent collection by the bank. Since the accumulation operation presents security risks, given that any attempted fraud would involve attempting to modify the sum accumulated by the service provider, a SAM is required to check transaction signatures and accumulate them.

FIG. 4 attached illustrates this version using the same numbering as the previous figures.

The advantage of this version is that the terminal contains no secret master key, thereby improving security. There are, however, two drawbacks remaining:

the cost of cards capable of performing calculations based on public-key algorithms is high since the computing power required for a given response time is significant;

a SAM is required.

The third type of procedure uses interactive signature systems. The use of this technique makes it possible to reduce considerably the computing power required by the cards by a ratio of 10 to 20 with the parameter settings currently in use. For identical computing power, the response times are thus better. For identical response times, the cost of components for EW cards is less.

Generally speaking, two authentication systems are used, namely the Guillou-Quisquater (GQ) and the Fiat-Shamir (FS). The issue of "L'Echo des Recherches" cited above includes all the bibliographic references concerning these two systems.

We will give a brief summary of this type of signature procedure, using the CQ system as an example. In this example the card, referred to as Ci, uses the following functions or parameters:

g: 64 to 512 bit expansion function, h: hashing function yielding a 64-bit result,

*: operation restricting to 128 low order bits, $S_A$ and $P_A$: the authority's secret and public keys: 768 bits, i: identity of the card: 64 bits, n: module: 512 bits, cer: $S_A$ (i,n,e): 768 bits, e: n first number: 16 bits, v: $1/I^{1/e}$ mod n: 512 bits.

Secure terminal Tj posses public key $P_A$, g, h and is identified by j in 64 bits.

The procedure is as follows:

1) the terminal sets the sum m of the transaction, draws a random number r and constitutes the parameter M, combining m, j and r; it then transmits M to the card;
2) the card checks that the balance is greater than the sum m of the transaction; if this is the case, the card draws a random number x, calculates $t=x^e$ mod n and b=h(t*, M) and transmits i, b and certificate cer=$S_A$ (i,n,e) to the terminal;
3) the terminal checks the certificate and obtains i, n and e, selects a random number c less than e and sends c to the card;
4) the card calculates $y=xv^c$ mod n, reduces the balance by m and transmits y and t* to the terminal;
5) the terminal calculates I=g(i), the quantity $u=(y^eI^c$ mod n)*, followed by h(u,M) and checks that b is equal to h(u,M); the terminal then increases the balance by m.

This procedure can be summarized as follows:

the card selects a random number x, calculates $t=x^e$ mod n and sends b=h(M,t) to the terminal, the terminal selects a random number c such that 0<c<e and sends it to the card, the card responds with $y=xv^c$ mod n, the terminal then checks that if $u=y^eI^c$, then b=h(M,u) since $v^eI=1$ mod n.

This procedure is illustrated in FIG. 5 attached. Its advantage lies in the fact that the computing power required is less than in RSA-type procedures. But one drawback remains: the procedure requires a SAM. The interactive signature is of no value unless it is certain that random number c has been correctly submitted to the card in the given order. For this reason interactive signatures are known as "throwaway"; they can only be used at the time they are obtained. The interactive signature comprises data M, cer, b, c, and y. It is therefore easy to create this data out of nothing: if cer and M are known, p and i can be obtained; all that remains is to select y and c and to calculate $t=y^eI^c$ and b=h(M,t). The data obtained M, cer, b, c and y constitute a valid signature.

The purpose of the present invention is to overcome precisely these drawbacks.

DISCLOSURE OF THE INVENTION

The invention proposes a dual signature procedure in which one signature is of the public or secret key type (referred to as y above), and the other is based on a secret-key algorithm (referred to as z above) This dual signature is designed to combine the advantages of the two techniques and therefore consists in judiciously combining the two signatures with signed information to obtain the desired advantages.

As has been explained above, in an RSA-type signature proof of debit of the card is obtained by calculating the signature y=s(M) that can be checked by the service provider, without which the service provider would have to contain secret information since it operates using the public key. This is illustrated in FIG. 3.

In a secret-key procedure, the proof z is obtained using a secret-key algorithm to calculate z=f(k,m,j,r) where k is the secret key and, in a modification excluding a SAM, z cannot be checked by the service provider but only by the bank. This proof z, together with i and M, is stored by the service provider and subsequently collected by the bank.

According to the invention, these two procedures are combined such that signature y, which can be checked by the service provider, is dependent on signature z which cannot be checked by the service provider. This gives $y=s(M,z)$ instead of $y=s(M)$. Therefore for the user to modify z to z' would require y to be changed to $y'=s(M,z')$, which is impossible since the function s is only known to the card.

In an interactive signature procedure instead of the card calculating the function $b=h(M,t)$ as described above, with $t=x^e \bmod n$, a function b that includes proof z is calculated: $b=h(M,t,z)$. If z is modified by the user to z' the service provider's software will detect this change. In fact, t is only revealed indirectly on completion of the transaction. Therefore the user cannot calculate $b'=h(M,t,z)$ when b' must be sent to the service provider.

More exactly, the purpose of the invention is to provide a procedure for performing an electronic transaction between a user possessing a card, a service provider possessing a terminal capable of accepting said card, and a centralized system capable of being periodically connected to the terminal, wherein:

- the terminal transmits a parameter comprising at least the sum of the transaction to the card,
- the card debits the said sum from the balance,
- the card and the terminal calculate and exchange various data, certain of which are signed by the card by means of a public or secret algorithm,
- the terminal checks the data signed by the said public or secret algorithm and stores the individual parameters of the various transactions effected,
- the centralized system periodically collects the stored data when it is connected to the terminal and credits the service provider with the corresponding amounts,
- said procedure being characterized by the fact that it is a dual signature procedure, the data being signed by the card by means of the public or secret algorithm comprising a proof z that the card has been debited, said proof z being a function of the parameter and of a secret debit key, the terminal thereby also storing the different proofs of the transactions effected without being able to check said proofs, the centralized system also collecting said proofs and checking them using the secret debit key and only crediting the service provider on condition the checking operation is positive.

If payment is made on line with a service provider, the algorithm may be of the secret key type.

DETAILED DISCLOSURE OF AN EMBODIMENT

Figure 1:
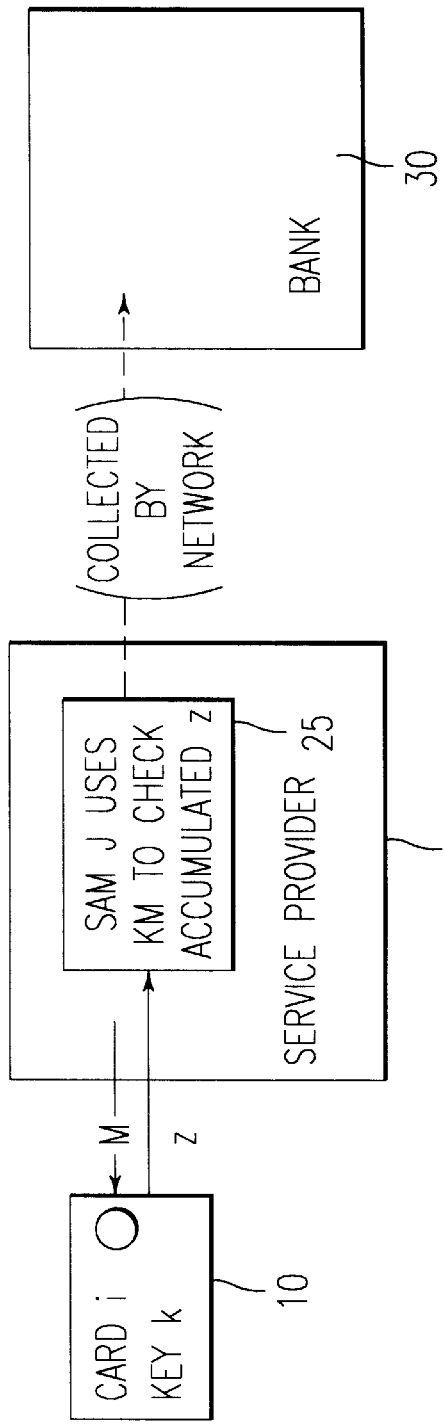
FIG. 1 (described above) shows a known signature procedure using a secret-key algorithm and an off-line terminal.
Figure 2:
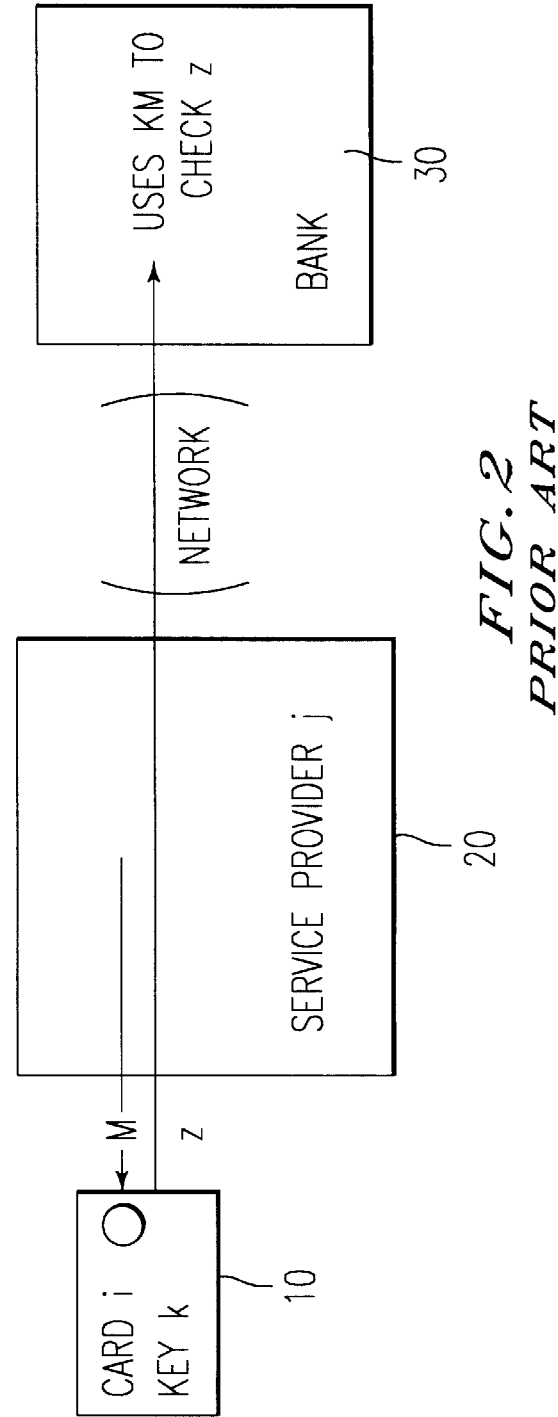
FIG. 2 (described above) shows a known signature procedure using a secret-key algorithm and a terminal connected to the bank.
Figure 3:
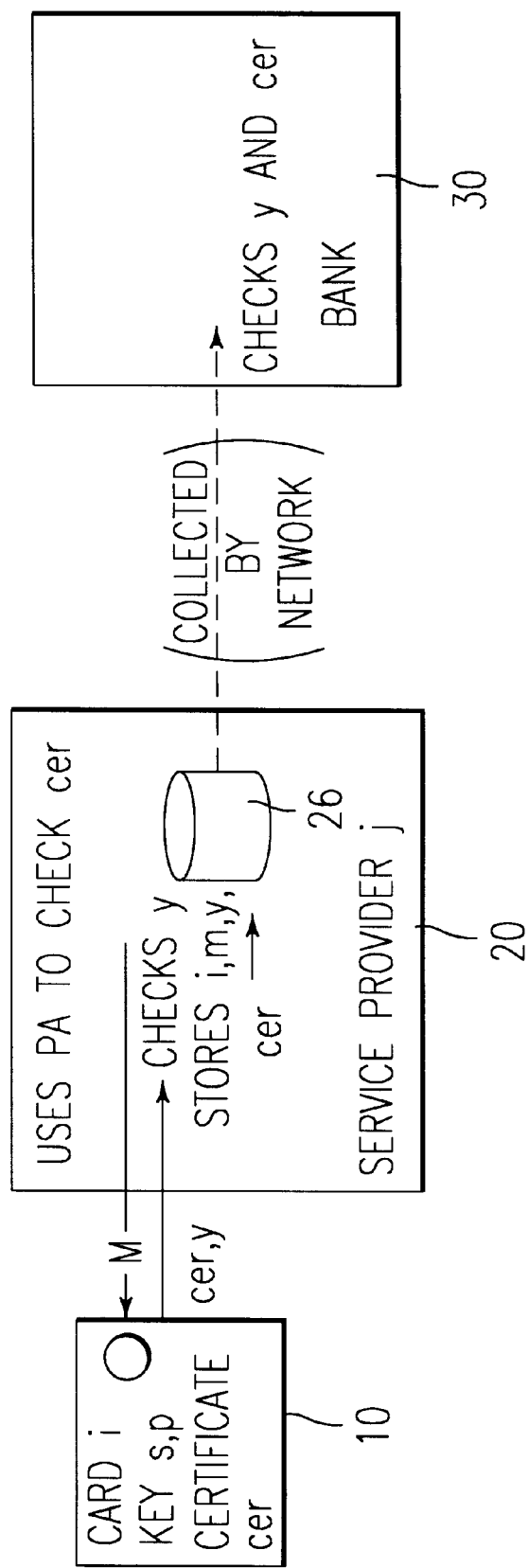
FIG. 3 (described above) shows a known signature procedure using a public-key algorithm without a Secure Application Module.
Figure 4:
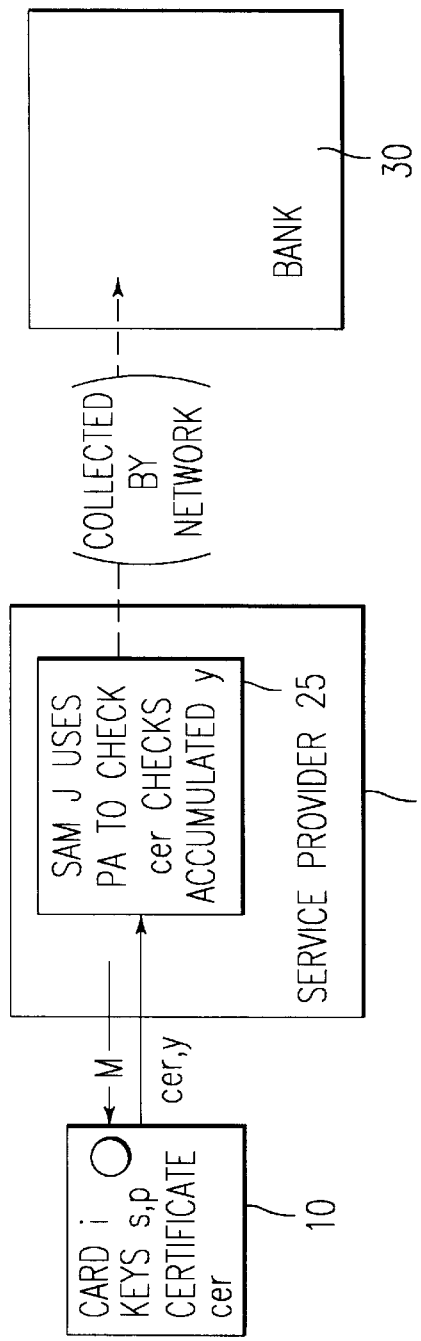
FIG. 4 (described above) shows a known signature procedure using a public-key algorithm with a Secure Application Module.
Figure 5:
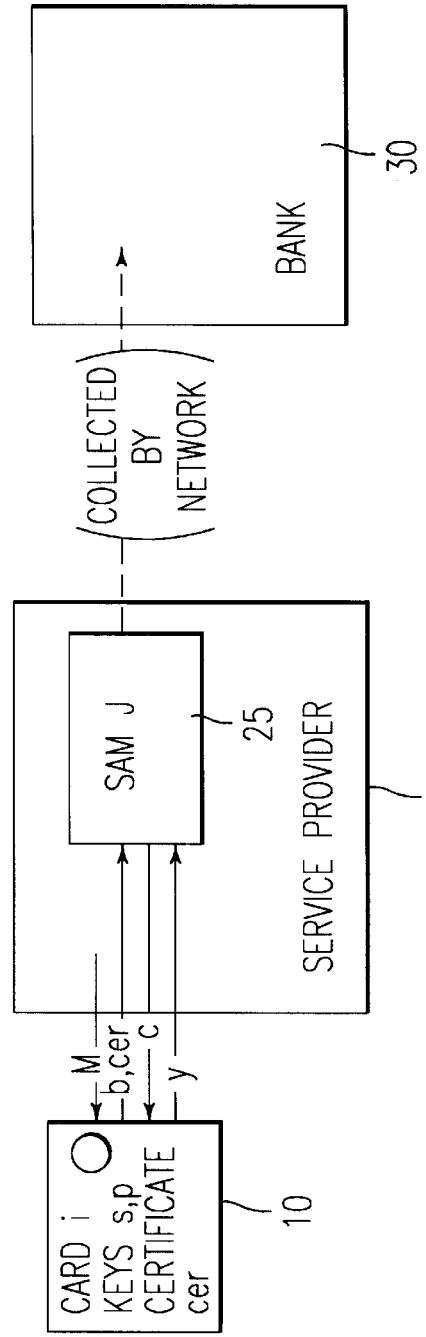
FIG. 5 (described above) shows a known interactive signature procedure.
Figure 6:
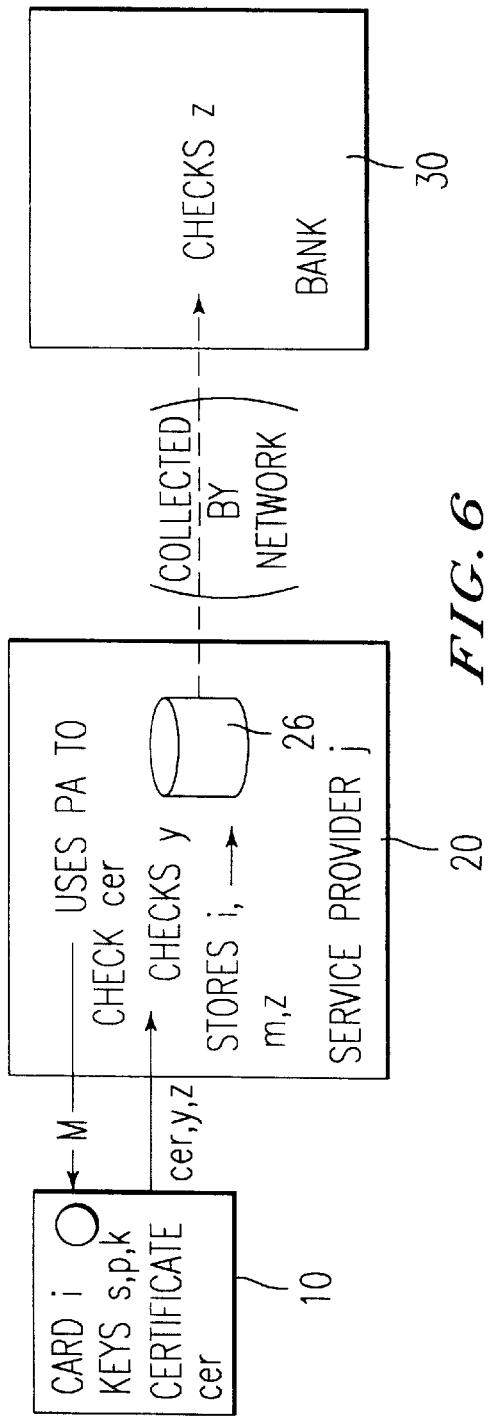
FIG. 6 shows a first embodiment of the invention in a procedure using a public-key signature.
Figure 7:
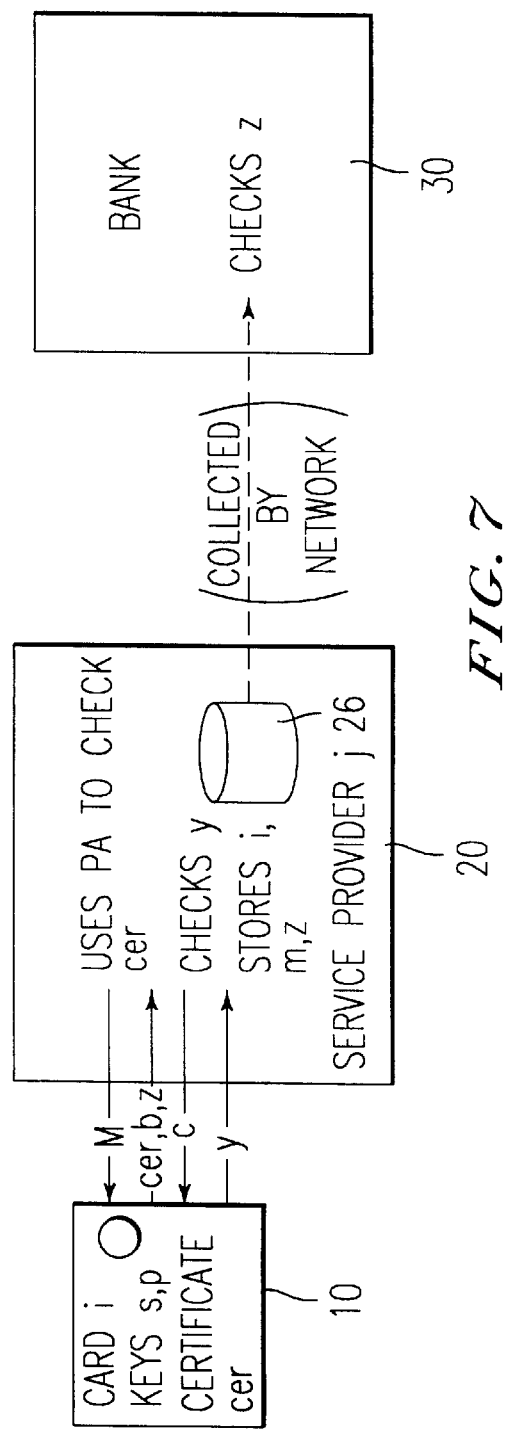
FIG. 7 shows a second embodiment of the invention in a procedure using an interactive signature.

An embodiment of the invention using an interactive signature will now be described as an example. The following abbreviations are used:

g: 48 to 512 bit expansion function, h: hashing function yielding a 128-bit result, f: secret-key (e.g. DES) signature calculation function: 64 bits,

*: restriction to k.64 low order bits; k can be set to 4 to 8, $S_A$ and $P_A$: the authority's secret and public keys: 768 bits. The data contained on card are as follows:

i: identity of the card: 48 bits n: module: 512 bits cer: $S_A(i,n,e)$: 768 bit certificate e: $2^{16}+1$ v: $1/I^{1/e} \bmod n$: 512 bits k: secret debit key, 64 bits bal: balance on card: 32 bits h,f.

The data contained in the service provider terminal are as follows:

$P_A$,g,h j: terminal identity: 48 bits m: sum: 16 bits r: reading on counter: 32 bits The successive options are thus as follows:

1) The service provider's terminal sets the sum m of the transaction and constitutes M from m, j, and the reading r on the counter and sets this reading to r+1; the service provider transmits M to the card.

2) The card checks that the balance is not lower than sum m. If this check proves positive, the card selects a 512-bit random number x, calculates $t=x^e \bmod n$, calculates the proof z using the secret debit key k, i.e. $z=f(k,M)$, also calculates $b=h(t^*,M,z)$, debits the sum m from the balance and records M; the card contains the authorization certificate cer=$S_A(i,n,e)$ where $S_A$ is the authority's secret key; the card finally transmits proof z, function b and certificate cer to the service provider's terminal.

3) The service provider's terminal checks certificate cer using the authority's public key $P_A$ to obtain n, e and i; it selects a 16-bit random number c, also known as the challenge, and transmits c to the card.

4) The card calculates $y=xv^c \bmod n$ and transmits y to the service provider's terminal.

5) The service provider's terminal calculates $I=g(i)$, then $u=(y^e I^c \bmod n)$; it checks that b equals $h(u,M,z)$ and if this check proves positive it validates the transaction. The terminal collects i, M and z and sends this data to the bank.

6) Using i, the bank obtains the secret debit key k and checks proof $z=f(k,M)$. The bank checks that the counter r of the service provider's terminal has advanced and if this is so, credits the account of service provider j with the sum m.

This procedure may be modified by eliminating the throw-away character of the interactive signature. This is done by changing $z=f(k,M)$ to $z=f(k,M,t^*)$. The method for generating an interactive signature (i,m,cer,y,z) described above will no longer work: y, c and M are selected; $t^*=(y^e I^c$ mod n) is calculated; b=h(t*,M,z) is calculated but t does not satisfy z=f(k,M,t*). Data items i, M, z, t*, b, c and y must be stored by the service provider.

The level of security of the above protocol is determined by the size of challenge c; for example, if c has a size of 16 bits there is one chance in $2^{16}$=65,536 of card forgers guessing c and artificially creating a transaction. The calculating time of the card is also directly proportional to this level of security. The level of security may be varied by modifying the length of the random number c that is transmitted by the terminal to the card where the signature is interactive. An improvement therefore consists in allowing the service provider to adjust the security level according to parameters such as the size of the transaction, the likelihood of forged cards being used, which is higher for remote than contact payment, etc.

It will be seen from this description that the procedure of the invention has many advantages:
- it requires little computing power, therefore EW cards can give comparable performances at lower cost; alternatively, at comparable computing power response time will be improved,
- it can be used without service providers requiring a SAM,
- it minimizes by a ratio of 5:10 the storage memory required by the service provider,
- it reduces the quantity of data to be transferred from the service provider to the bank by the same proportion,
- it can be used with a SAM if it is preferred that transactions be accumulated by the service provider; since, however, the SAM used contains no secret key, it presents little security risk,
- security levels can be adjusted according to the characteristics of the transactions.

It might be thought that a level of security of $2^{16}$ is low compared with the 64-, even 512-bit, levels commonly found in cryptography. It should, however be noted that as far as the cost of finding the key is concerned (v in the present case), i.e. the number of iterations required to find the key using a challenge-response pair, the proposed system has precisely the same security characteristics as standard systems. In order to take advantage of this $2^{16}$ security level, a forged card would have an average of 32,000 attempted transactions refused before one was accepted.

What is claimed is:

1. A method for performing electronic transactions between a card, a service provider having at least one terminal configured to accept said card and a centralized system configured to be connected to said terminal, each card having a card secret key and a card certificate which is a function of a card identity and of two card parameters defining a card public key, said function depending on said card secret key, each card further having a card secret debit key based on said card identity, said terminal having a terminal identity and knowing said card public key, said centralized system knowing said card secret debit key based on said card identity, said method comprising the steps of:

transmitting from the terminal to the card the terminal identity and a parameter comprising at least a sum to be debited from a card balance;

checking by said card that said card balance is not lower than said sum;

computing by said card a first signature which is a function of the card secret debit key and of said parameter transmitted from the terminal;

debiting by said card the sum from the card balance, said first signature being a proof that the sum has been debited from the card balance;

computing by said card a second signature which is a function of said parameter transmitted from the terminal and of said first signature using said card secret key;

transmitting from the card to the terminal said first signature, said second signature and said card certificate;

checking by said terminal said card certificate by using the card public key;

recovering by said terminal the card identity and the two parameters of said card;

checking by said terminal said second signature by using the card public key;

storing in said terminal data corresponding to said first signature, said parameter transmitted from the terminal and said card identity for performed transactions;

collecting said data corresponding to performed transactions by said centralized system;

obtaining by the centralized system secret debit keys corresponding to identities of cards having performed a transaction;

checking by the centralized system first signatures, computed by said cards, based on card secret debit keys of said cards; and crediting the service provider of sums on condition that said first signatures check with said card secret debit keys.

2. A method for performing electronic transactions between a card, a service provider having at least one terminal configured to accept said card and a centralized system configured to be connected to said terminal, each card having a card secret key and a card certificate which is a function of a card identity (i) and of two card parameters (n,e) defining a card public key, said function depending on said card secret key, each card further having a card secret debit key based on said card identity, said terminal having a terminal identity and knowing said card public key, said centralized system knowing said card secret debit key based on said card identity, said method comprising the steps of:

transmitting from the terminal to the card the terminal identity and a parameter (M) comprising at least a sum to be debited from a card balance;

checking by said card that said card balance is not lower than said sum;

selecting by said card a random number (x);

calculating by said card a first number $t=x^e$ mod n, where e and n define said card public key;

calculating by said card a first signature (z) based on said card secret debit key, said first signature being a proof that the sum has been debited from the card balance;

calculating by said card a checking number (b) that is a function (h) of said parameter (M) transmitted from the terminal, of said first signature (z) and of a second number (t*) restricting said first number (t) to low-order bits (b=h(t*, M, z));

transmitting from said card to said terminal said first signature, said checking number, and said card certificate;

checking by said terminal said card certificate by using the card public key;

recovering by said terminal the card identity and the two parameters of said card;

selecting by said terminal a challenge random number (c);

transmitting said challenge number from said terminal to the card;

calculating by said card a second signature (y) based on said random number (x) and said challenge random number (c);

transmitting said second signature from said card to the terminal;

calculating by said terminal an expansion function I=g(i) of said card identity (i);

calculating by said terminal a number $u=(y^e I^c \bmod n)$;

checking by said terminal that b=h(u,M,z);

storing in said terminal data corresponding to said first signature (z), to said parameter (M) and to said card identity (i) for performed transactions;

collecting said data corresponding to performed transactions by said centralized system;

obtaining by said centralized system secret debit keys corresponding to identities of cards having performed a transaction;

checking by said centralized system first signatures, computed by said cards, based on card secret debit keys of said cards; and crediting the service provider of sums on condition that the first signatures check with the card secret debit keys.

3. A method according to claim 2, further comprising varying the length of said challenge random number (c).

4. A method for performing electronic transactions between a card and a service provider having at least one terminal configured to accept said card, each card having a card secret key and a card certificate which is a function of a card identity and of two card parameters defining a card public key, said function depending on said card secret key, each card further having a card secret debit key based on said card identity, said terminal having a terminal identity and knowing said card public key, said method comprising the steps of:

transmitting from the terminal to the card the terminal identity and a parameter comprising at least a sum to be debited from a card balance;

checking by said card that said card balance is not lower than said sum;

computing by said card a first signature which is a function of the card secret debit key and of said parameter transmitted from the terminal;

debiting by said card the sum from the card balance, said first signature being a proof that the sum has been debited from the card balance;

computing by said card a second signature which is a function of said parameter transmitted from the terminal and of said first signature using said card secret key;

transmitting from the card to the terminal said first signature, said second signature and said card certificate;

checking by said terminal said card certificate by using the card public key;

recovering by said terminal the card identity and the two parameters of said card;

checking by said terminal said second signature by using the card public key; and storing in said terminal data corresponding to said first signature, said parameter transmitted from the terminal and said card identity for performed transactions.

5. A method for performing electronic transactions between a card and a service provider having at least one terminal configured to accept said card, each card having a card secret key and a card certificate which is a function of a card identity (i) and of two card parameters (n,e) defining a card public key, said function depending on said card secret key, each card further having a card secret debit key based on said card identity, said terminal having a terminal identity and knowing said card public key, said method comprising the steps of:

transmitting from the terminal to the card the terminal identity and a parameter (M) comprising at least a sum to be debited from a card balance;

checking by said card that said card balance is not lower than said sum;

selecting by said card a random number (x);

calculating by said card a first number $t=x^e \bmod n$, where e and n define said card public key;

calculating by said card a first signature (z) based on said card secret debit key, said first signature being a proof that the sum has been debited from the card balance;

calculating by said card a checking number (b) that is a function (h) of said parameter (M) transmitted from the terminal, of said first signature (z) and of a second number (t*) restricting said first number (t) to low-order bits (b=h(t*, M, z));

transmitting from said card to said terminal said first signature, said checking number, and said card certificate;

checking by said terminal said card certificate by using the card public key;

recovering by said terminal the card identity and the two parameters of said card;

selecting by said terminal a challenge random number (c);

transmitting said challenge number from said terminal to the card;

calculating by said card a second signature (y) based on said random number (x) and said challenge random number (c);

transmitting said second signature from said card to the terminal;

calculating by said terminal an expansion function I=g(i) of said card identity (i);

calculating by said terminal a number $u=(y^e I^c \bmod n)$;

checking by said terminal that b=h(u,M,z); and storing in said terminal data corresponding to said first signature (z), to said parameter (M) and to said card identity (i) for performed transactions.

* * * * *